June 3, 1930.  F. NEALE  1,761,309

MOTOR CYLINDER

Filed July 22, 1927

INVENTOR.
Fred Neale
BY
Charles French
ATTORNEYS

Patented June 3, 1930

1,761,309

UNITED STATES PATENT OFFICE

FRED NEALE, OF CLEVELAND, OHIO, ASSIGNOR, BY MESNE ASSIGNMENTS, TO THE CHRISTENSEN AIR BRAKE COMPANY, OF CLEVELAND, OHIO

MOTOR CYLINDER

Application filed July 22, 1927. Serial No. 207,781.

The invention relates to cylinders, and brake cylinders in particular.

In that type of brake cylinder wherein fluid-pressure acts against a piston to move the same to transmit its force through the thrust connections to the brake member, considerable trouble has been caused by the entry of water, dirt and other foreign matter into the chamber formed between the back of the piston and the end cover, during operation, causing rust of the cylinder with the eventual result of injuring the sealing means, particularly where such sealing means is a metal cup, by the scratching of said cup as it nears the end of its stroke and thus causing leakage past it. The object of this invention is to provide a cylinder construction that prevents the entry of water, dirt and other foreign matter into the cylinder chamber behind the piston.

The invention further consists in the several features hereinafter set forth and more particularly defined by claims at the conclusion hereof.

Figure 1:
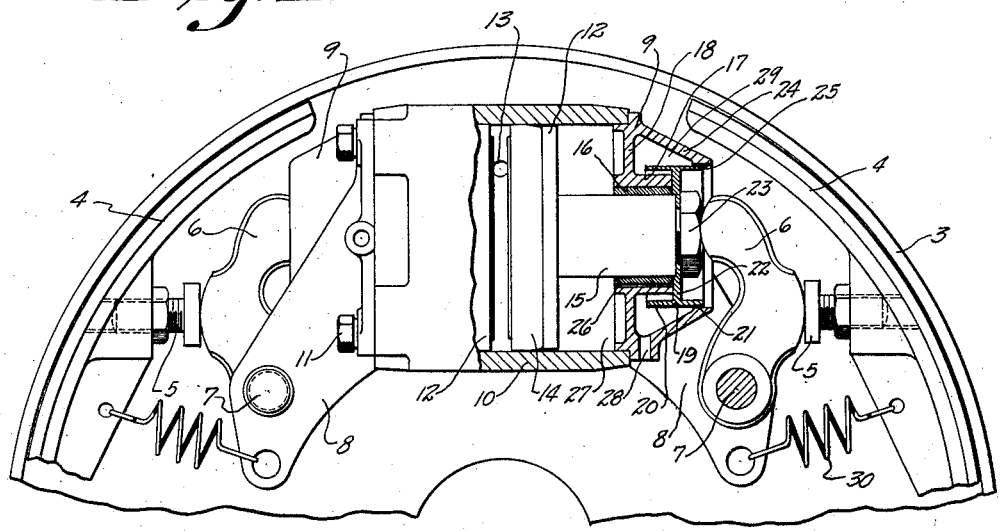
Figure 2:
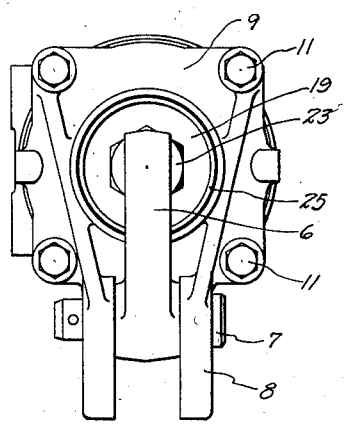

In the drawings Fig. 1 is a view of a brake cylinder embodying the invention, with parts shown in section and parts of a brake member or members associated therewith;

Fig. 2 is an end view of the brake cylinder.

The numeral 3 designates a portion of a brake drum, 4 the free ends of a brake band or brake shoes, 5 an adjustable stud secured to said band or shoes, 6 a lever pivotally mounted on a pin 7 mounted in a pair of spaced arms 8 formed integral with each brake cylinder end cover 9 and 10 the brake cylinder to which said covers are secured by bolts 11.

A pair of pistons 12 are mounted to reciprocate in the brake cylinder, which is secured to a relatively fixed support, and are moved to brake application position by compressed air or other fluid introduced into said cylinder through a port 13 between the pistons. Each of these pistons has a metal cup form of packing or sealing means 14 secured to its head and a rod 15 slidably mounted in a bushing 16 secured in a cylindrical boss 17 in the front wall 18 of the cover 9.

A cover 19 is secured to the end of the piston-rod and is shown as a ring having oppositely disposed peripheral flanges 20 and 21 and a web 22 centered and clamped on the outer end of the rod by a nut 23.

The cylinder cover 9 has an outer wall portion 24 and the cover 19 is fitted to move in the opening 25 in said wall with a small clearance.

The inner wall of the cover has a small passage or orifice 26 formed therein so that when the fluid under pressure is applied to the space between the two pistons the piston moves along the cylinder reducing the volume of chamber 27 behind the piston and thereby causing a flow of air through passage 26.

The cover 9 has a discharge orifice or opening 28 directed outwardly and preferably downwardly.

With this construction any foreign matter which is applied to the end of the piston must, in order to get inside the mechanism, pass the space between 19 and 25. If any foreign matter does get through this space it enters chamber 29 formed between the outer and inner walls of the cover and the parts of the piston and such foreign matter has a means of egress into the atmosphere through the hole or opening 28 or a series of holes.

The cover 19 of the piston-rod is of such length that when in the position shown in the drawing it has ample clearance between its inner extremity and the inner wall of the chamber 29. As the volume of chamber 27 is decreased air is forced through orifice 26 into chamber 29 and thence through opening 28. In its passage through chamber 29 foreign matter is picked up by this air and by it blown through said opening 28 into the atmosphere. The flange 20 forms a shield about the bushed end of the cover and at the same time directs the air from chamber 27 toward the inner wall adjacent the opening 28.

When the piston moves outwardly its piston-rod engaging the free end of the lever 6 swings said lever outwardly and the lever in turn imparts its thrust to the stud 5 and hence to the brake band or shoe, the parts being returned to a release position by means of a spring 30. The use of a lever is only illustrative of one form of thrust connection and it will be understood that the piston may have a direct thrusting connection with the end of the band or shoe, or other forms of connection may be used with the improved form of brake cylinder forming the subject matter of this invention.

I desire it to be understood that this invention is not to be limited to any particular form or arrangement of parts except in so far as such limitations are specified in the claims.

What I claim as my invention is:

1. In a cylinder, the combination with the cylinder body, of a cover plate secured thereto, a piston working in said cylinder and provided with a rod slidably mounted in said cover plate, said cover plate having a cavity formed therein about said rod and provided with an outlet for foreign matter and an orifice connecting the space in said cylinder behind the piston with said cavity whereby to produce a flow of flushing air into said cavity during the outward movement of the piston.

2. In a cylinder, the combination with the cylinder body, of a piston working therein, and a piston-rod, a cover plate provided with an apertured inner and outer wall to form a cavity, said rod working in said cavity and being slidably mounted in the opening in said inner wall and provided with a cover member slidably mounted in said outer wall and substantially covering the opening in said outer wall, said cover plate provided with an orifice for the escape of foreign matter from said cavity, and a flushing communication between the chamber behind the piston and said cavity.

3. In a cylinder, the combination with the cylinder body, of a piston working therein and a piston rod, a cover plate provided with an inner wall having an outwardly projecting guide portion for said rod and an outer wall having a guide opening for said rod and a cavity formed between said walls and provided with an outlet for foreign matter, said piston rod being slidably mounted in said guide portion and said guide opening and having a deflector portion projecting inwardly over said guide portion, said cavity cooperating with parts of said rod to form a flushing chamber, and means for introducing a stream of flushing air from the space behind the piston into said chamber.

In testimony whereof, I affix my signature.

FRED NEALE.